Sept. 27, 1966 G. POEHLER ETAL 3,275,692
RECOVERY OF PURE CYCLOHEXANONE AND CYCLOHEXANOL
Filed Oct. 21, 1964
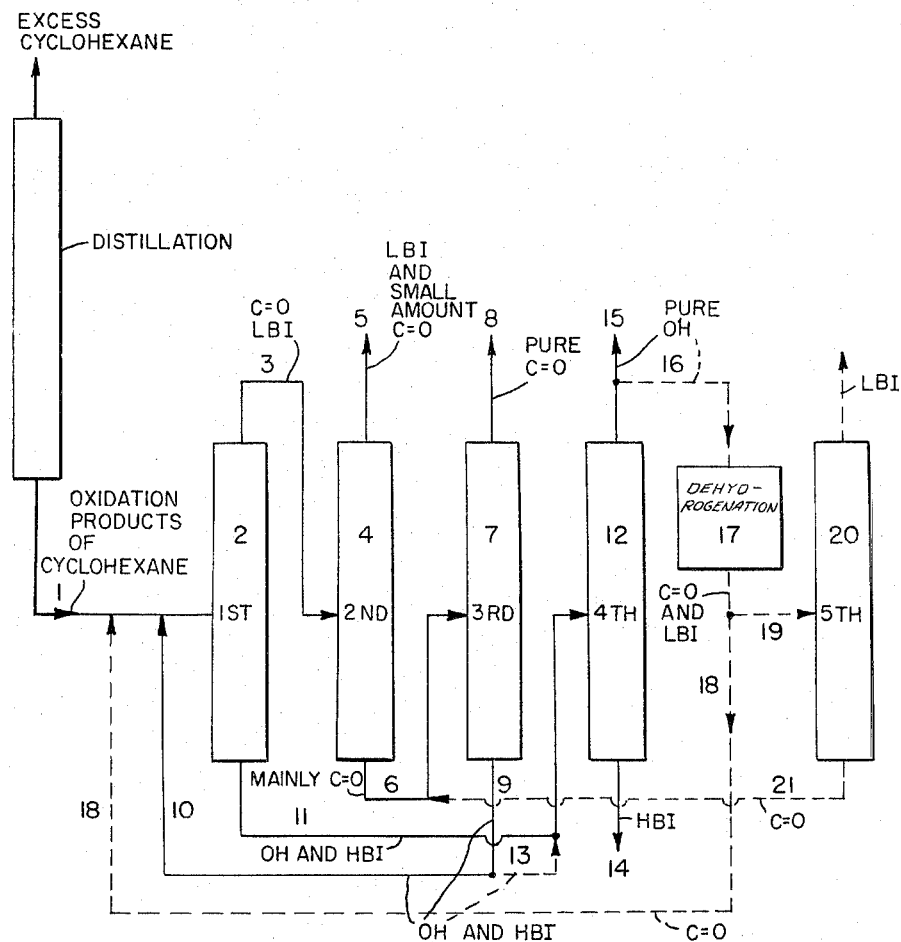
INVENTORS:
GUENTER POEHLER
HANS JOACHIM WALDMANN
HUBERT CORR
BY
Marzall, Johnston, Cook & Root
ATT'YS United States Patent Office 3,275,692
Patented Sept. 27, 1966

3,275,692
RECOVERY OF PURE CYCLOHEXANONE AND CYCLOHEXANOL
Guenter Poehler, Hans Joachim Waldmann, and Hubert Corr, Ludwigshafen (Rhine), Germany, assignors to Badische Anilin- & Soda-Fabrik Aktiengesellschaft, Ludwigshafen (Rhine), Germany
Filed Oct. 21, 1964, Ser. No. 405,387
Claims priority, application Germany, Dec. 16, 1959, B 55,935
5 Claims. (Cl. 260—586)

This is a continuation-in-part of our application Serial No. 75,732, filed December 14, 1960, now abandoned.

This invention relates to a process for the recovery of pure cyclohexanone and cyclohexanol from oxidation products or oxidation mixtures obtained by the action of oxygen or oxygen-containing gases on cyclohexane. More specifically, the invention relates to the working up of such mixtures by rectification at definite pressures.

It is known that a very pure cyclohexanone is required for the production of caprolactam. It is also known that cyclohexanone and cyclohexanol can be prepared by oxidation of cyclohexane with atmospheric oxygen at an elevated temperature, under increased pressure and in the presence of oxidation catalysts. This process is conveniently carried out in a plurality of stages and with low degrees of conversion. A number of methods have become known in which the oxidation mixture is washed. It is advantageous to wash with water after each stage and to wash with a solution of alkali hydroxide or alkali carbonate after the last stage. In the washing, especially the impurities which have acid nature or will react with alkali, such as carboxylic acids and carboxylic acid esters, are separated. After distilling off the excess cyclohexane, the cyclohexanone and cyclohexanol are obtained by rectification of the residue, which is usually carried out under reduced pressure. Certain impurities, however, remain obstinately with the cyclohexanone. These impurities include cyclopentanol, cyclopentanone, normal amyl alcohol, 2-methylbutanol, methyl normal-butyl ketone, ethyl normal-propyl ketone and di-normal-propyl ketone. The impurities lower the carbonyl number of the cyclohexanone and also decrease the resistance of the product to potassium permanganate. Whereas high-purity cyclohexanone exhibits permanganate resistance of many hours, the products obtained from the said oxidation mixtures by simple rectification under reduced pressure are resistant to permanganate at the most a few minutes, usually less than a minute. If cyclohexanone obtained in this way is reacted with hydroxylamine and caprolactam and polycaprolactam are prepared therefrom in the usual manner, it is found that the polyamides are either yellowish from the start or have a great tendency to become yellow subsequently. Caprolactam prepared from impure cyclohexanone shows little resistance to permanganate and contains volatile bases.

It is the chief object of the present invention to provide a process for the recovery of pure cyclohexanone and cyclohexanol suitable for the production of colorless polycaprolactam which does not become yellow from mixtures which occur in the oxidation of cyclohexane with oxygen or oxygen-containing gases. This and other objects and advantages of this invention will become more apparent from the following detailed description in conjunction with the accompanying diagrammatic drawing in which an apparatus for the rectification of the said oxidation mixtures in accordance with the invention is shown.

The present invention is based on the discovery that impurities which have a lower boiling point than cyclohexanone (hereinafter called low boiling impurities) can be the more satisfactorily separated from cyclohexanone by rectification the higher the pressure applied. Whereas at a pressure of, for example, 20 mm. Hg the separation of low boiling impurities will be unsatisfactory, the difference in the vapor pressures of the said constituents at about 300 mm. Hg is sufficiently large for a successful separation. The invention is further based on the fact that cyclohexanol and cyclohexanone can be separated especially advantageously under reduced pressure. In accordance with the process of the present invention, the low-boiling impurities are separated from cyclohexanone by fractionation or rectification at a pressure between 300 mm. Hg and 5 atmospheres, whereas the separation of cyclohexanol and cyclohexanone is carried out at a pressure between 10 and 100 mm. Hg.

It is especially advantageous to carry out the separation of the low boiling impurities from the cyclohexanone at a pressure between 400 and 100° mm. Hg. For practical reasons, it is usual to work at atmospheric pressure. In the separation of impurities which have a boiling point higher than that of cyclohexanol (hereinafter referred to as higher boiling impurities) from cyclohexanol, however, the pressure is not critical. To avoid unnecessary expenditure of apparatus, it is advantageous to operate the rectification column, in which separation is carried out, under the same pressure as prevails in the column in which the cyclohexanone and cyclohexanol, are separated. It is however also possible to apply the same pressure as in the separation of cyclohexanone and low boiling impurities, for example atmospheric pressure.

In the mixtures obtained by oxidation of cyclohexane there are contained four substances or groups of substances, namely cyclohexanone, cyclohexanol, low boiling impurities and higher boiling impurities. In accordance with this invention the oxidation mixture freed from excess cyclohexane is supplied to a column where it is separated into a higher boiling fraction comprising cyclohexanol and the higher-boiling impurities and a lower boiling fraction comprising cyclohexanone and the low boiling impurities at a pressure between 10 and 100 mm. Hg and a reflux ratio which is preferably between 15:1 and 1:1, in particular between 10:1 and 1:1. The low boiling impurities are then separated from the top product in a second column at a pressure of from 300 mm. Hg to 5 atmospheres, preferably 400 to 1000 mm. Hg and a reflux ratio which is preferably between 20:1 and 5:1, in particular between 15:1 and 5:1. The cyclohexanone is withdrawn as bottoms and recovered in pure form in a third rectification, which in general is carried out at a pressure from 1 mm. Hg to 5 atmospheres, preferably between 10 and 200 mm. Hg, and a reflux ratio between 12:1 and 1:1, preferably between 10:1 and 1:1. From the bottoms of the first rectification there is obtained by a fourth rectification at a reflux ratio similar to that applied in the third rectification, cyclohexanol as well as higher-boiling impurities which are withdrawn as bottoms. It will be obvious to those skilled in the art that the upper limits specified for the reflux ratio are not critical. They are only determined by economic considerations.

Suprisingly, the sequence of the operations for the separation of the said substances or groups of substances decisively influences the success of the process. It is essential that the cyclohexanone and low boiling impurities should be separated from the cyclohexanol jointly. By first removing the low boiling impurities and only then separating the cyclohexanone from the cyclohexanol a cyclohexanone is obtained which contained substantial amounts of low boiling impurities even if removal of the low boiling impurities is effected at a pressure between 300 mm. Hg and 5 atmospheres.

In most cases it is desirable to dehydrogenate the cyclohexanol to cyclohexanone. This dehydrogenation does not belong to the essence of the present invention. It is carried out in conventional manner, for example at a temperature between 150° and 400° C., especially between 200° and 350° C., and in the presence of heavy metals of Group I, II or VIII of the Periodic System, especially copper, nickel or zinc, or oxides of Group V or VI of the Periodic System, such as vanadium oxide, chromium oxide or molybdenum oxide, as catalysts. The said substances may be applied to carriers, such as alumina, silicic acid, silicates, magnesia, titanium dioxide, zinc oxide or zirconium dioxide. The cyclohexanone obtained by dehydrogenation can then be returned to a suitable previous stage of the working up process for the oxidation mixture. For example it may be added to the original mixture still containing all of the said four components. It is however also possible to supply the cyclohexanone obtained from the cyclohexanol to another point of the working up process, for example to the rectification in which the low boiling impurities are separated from cyclohexanone.

As stated above, the separation of the low boiling impurities from the cyclohexanone proceeds the better the higher the pressure within the range specified above. It will therefore be obvious to the expert that no generally applicable statements can be made as to separating efficiency of the columns required, particularly since it is known that the necessary theoretical number of trays also depends on the reflux conditions and the pressure applied. The same considerations naturally also apply for the separation of cyclohexanol and cyclohexanone. For example, if the oxidation product is separated at a pressure between 10 and 100 mm. Hg absolute and a reflux ratio of 3:1 into two fractions, of which one consists mainly of cyclohexanol and the other mainly of cyclohexanone, a first column with at least 45 actual trays is required. In order to separate the low boiling impurities from the cyclohexanone fraction at a pressure between 400 and 1000 mm. Hg absolute and a reflux ratio of 9:1, a second column with at least 30 actual trays is required. In order to recover pure cyclohexanone from the residue, the residue can, for example, be distilled at a pressure of 10 to 1000 mm. Hg and a reflux ratio of 2:1 in a third column with at least 10 actual trays. The fraction which is withdrawn from the bottom of the first column and which consists mainly of cyclohexanol is freed from high boiling impurities in a fourth column, preferably at a reduced pressure, for example between 10 and 100 mm. Hg, and at a reflux ratio of 1.5:1 and separated into pure cyclohexanol and higher boiling impurities, a column with at least 20 actual trays being used. It will be obvious to any expert that columns with a larger number of trays can be used for all purposes specified, for example columns with 50, 80 or more actual trays.

Rectification may be carried out in any separating columns used in industry, i.e., in packed columns, bubble tray columns and perforated tray columns.

By the process according to this invention, a cyclohexanone can be obtained which satisfies even the highest purity requirements such as apply in the production of high quality caprolactam. Oxidation of cyclohexane with atmospheric oxygen may be carried out for example according to the U.S. patent specification No. 2,938,924. It is however also possible by the method according to the present process to separate oxidation mixtures obtained by other usual methods by oxidation of cyclohexane with oxygen or oxygen-containing gases and separation of excess cyclohexane.

An apparatus suitable for carrying out the process according to this invention is illustrated by way of example in the accompanying drawing. The abbreviated legends in the drawing are defined as follows:

ABBREVIATIONS

| | |
|---|---|
| C=O | Cyclohexanone. |
| OH | Cyclohexanol. |
| LBI | Low boiling impurities. |
| HBI | High boiling impurities. |

An oxidation product which has been treated with air, washed with water and alkali solution and freed from cyclohexane is led through a pipe 1 into a column 2 (first rectification) in which it is separated into a low boiling point top product consisting mainly of cyclohexanone and a more difficultly volatile residue consisting mainly of cyclohexanol. The top fraction, if necessary after condensation, is introduced through a pipe 3 into a column 4 (second rectification) from which a small amount of cyclohexanone together with more readily volatile components, mainly amyl alcohol, are withdrawn as top product through a pipe 5. This mixture can be coemployed in the production of adipic acid by oxidation of cyclohexanol/cyclohexanone with nitric acid. The bulk of the product obtained in column 4 consists of pure cyclohexanone which is introduced through a pipe 6 into a column 7 (third rectification). In this column small amounts of higher boiling constituents, mainly cyclohexanol, are separated and pure cyclohexanone is obtained as top product and is withdrawn through a pipe 8. The higher boiling constituents are withdrawn from the sump of column 7 through a pipe 9 and returned through pipe 10 into the pipe 1. The residue which is obtained by distilling the oxidation product in column 2 is introduced through a pipe 11 into a column 12 (fourth rectification). The residue from the column 7 may also be supplied wholly or partly through pipes 9 and 13 to the pipe 11. The mixture is distilled for cyclohexanol in the column 12 at atmospheric pressure or preferably under reduced pressure, for example at 10 to 200 mm. Hg absolute. A small amount of high boiling residues is withdrawn through a pipe 14 and pure cyclohexanol as top product through a pipe 15. If the cyclohexanol is also to be converted into cyclohexanone, it is led through a pipe 16 into a dehydrogenation vessel 17. The cyclohexanone formed can be directly returned into the working up process, for example through a pipe 18 into the column 2, or, more advantageously, through a pipe 19 into a column 20 in which in a fifth rectification it is freed from more readily volatile products. The fifth rectification is preferably carried out at a pressure between 100 and 1500 mm. Hg in a column having at least 30 actual trays, the reflux ratio being at least 9:1. The residue obtained in column 20 is then supplied to column 7 through pipes 21 and 6.

It will be obvious to any expert that the process described can be modified in various ways without affecting the essence of the invention. The invention is therefore not limited to the following examples but embraces all methods of operation which utilize the essence of the present process, i.e., first separating cyclohexanone and low boiling impurities from cyclohexanol at a pressure of from 10 to 100 mm. Hg, and then separating low boiling impurities from cyclohexanone at a pressure of 300 mm. Hg to 5 atmospheres.

*Example*

The mixture to be separated is prepared as follows:
9 cubic meters of cyclohexane at a temperature of 110° C. is led per hour into the bottom of a vertical reaction vessel of 4 cubic meters capacity. Similarly, 300 cubic meters of air per hour is introduced in fine dispersion and 15 grams of cobalt in the form of a solution of cobalt naphthenate in cyclohexane. The temperature in the interior of the reaction vessel is about 140° C. and the pressure about 25 atmospheres. The residual air which is circulated and the liquid oxidation mixture escape at the upper end of the oxidation vessel. The liquid oxidation mixture is mixed with 90 kilograms per hour of wash water and the two liquid phases are separated in a separating vessel from which gaseous oxidation products escape. The organic phase passes at 110° C. into a second oxidation vessel, also of 4 cubic meters capacity, to which air and oxidation catalyst are supplied in the above-mentioned manner and amount. After leaving the second oxidation vessel, the oxidation mixture is washed in the said manner with water and then mixed with 150 kilograms of fresh water. The organic phase is separated from the aqueous phase and the latter is used for washing the oxidation product immediately after it has left the oxidation vessel. The oxidation mixture is then mixed with 100 kilograms of 15% caustic soda solution and separated from the alkali solution in a separator. Then another washing with 100 kilograms of fresh water is carried out, the water separated and the oxidation mixture is freed from cyclohexane in a continuously operating column. In this way, 8.5 cubic meters per hour of cyclohexane is recovered, while 285 kilograms of oxidation products remain as a residue which is worked up into cyclohexanone and cyclohexanol.

The oxidation product is worked up in an apparatus according to the drawing. The oxidation product is separated at a pressure of 30 mm. Hg in a distillation column 2 with sixty bubble trays and at a reflux ratio of 3:1 into a top product boiling at 63° C. and consisting mainly of cyclohexanone and a more difficulty volatile product mainly consisting of cyclohexanol. The bottoms temperature is 100° C. The top product is condensed and passes into another column 4 with sixty bubble trays which is under atmospheric pressure. A reflux ratio of 9:1 is maintained and a first running of cyclohexanone with more readily volatile constituents, mainly amyl alcohol, is separated in an amount of about 5% of the oxidation product introduced. Cyclohexanone is withdrawn from the bottoms at a temperature of 160° C. For removal of small amounts of cyclohexanol it is distilled in a further column 7 with forty bubble trays at a reflux ratio of 2:1 and a pressure of 30 mm. Hg. The pure cyclohexanone is withdrawn from the top. From the bottoms of the column, in which a temperature of 97° C. prevails, a small amount of residue is withdrawn which is recycled to the first column 2 through the pipe 10. The residue from column 2 is distilled in the column 12 having forty bubble trays at a reflux ratio of 1.5:1, a pressure of 30 mm. Hg and a bottoms temperature of 145° C. 163 kilograms per hour of cyclohexanol is obtained as top product and 13 kilograms of higher boiling point constituents.

The cyclohexanol is dehydrogenated at a temperature increasing from 280° to 320° C. in the presence of a copper catalyst deposited on silicic acid. The dehydrogenation product is introduced into the column 2 through the pipe 18 and worked up together with the mixture to be separated. Dehydrogenation may also be carried out at a temperature increasing from 350° to 420° C. in the presence of a zinc catalyst.

If the cyclohexanol is dehydrogenated in the said manner and returned to the process, 240 kilograms of pure cyclohexanone per hour is obtained as top product of the column 7 after steady-state conditions have been set up.

What we claim is:

1. A process for the recovery of pure cyclohexanone and cyclohexanol from oxidation products which have been obtained by oxidation of cyclohexane with a gas selected from the group consisting of oxygen and oxygen-containing gases which comprises distilling off the excess cyclohexane, feeding the resultant composition to a first rectification zone and therein separating said oxidation products into cyclohexanone, minor amounts of cyclohexanol, and impurities having a lower boiling point than cyclohexanone as a first rectification zone overhead and into cyclohexanol and impurities which have a higher boiling point than cyclohexanol as a first rectification zone bottoms at a pressure of 10 to 100 mm. Hg absolute, subjecting said first rectification zone overhead to a rectification in a second rectification zone at a pressure of 300 mm. Hg absolute to 5 atmospheres to separate said first rectification zone overhead into a second rectification zone overhead consisting mainly of said impurities having a lower boiling point than cyclohexanone and a second rectification zone bottoms consisting mainly of cyclohexanone with minor amounts of cyclohexanol therein, subjecting the second rectification zone bottoms to a rectification at 1 mm. Hg absolute to 5 atmospheres in a third rectification zone to separate said second rectification zone bottoms into pure cyclohexanone as the third rectification zone overhead and said minor amounts of cyclohexanol as the third rectification zone bottoms, and subjecting the first rectification zone bottoms to a rectification in a fourth rectification zone to separate said first rectification zone bottoms into pure cyclohexanol as the fourth rectification zone overhead and said impurities which have a higher boiling point than cyclohexanol as the fourth rectification zone bottoms.

2. A process as defined in claim 1 wherein said rectification in said third rectification zone is carried out at a pressure between 10 and 200 mm. Hg absolute and said rectification in said second rectification zone is carried out at a pressure between 400 and 1000 mm. Hg absolute.

3. A process as claimed in claim 1 wherein said third rectification zone bottoms are recycled, mixed with said resultant composition, and are fed therewith to the first rectification zone.

4. A process as claimed in claim 1 wherein the cyclohexanol of said fourth rectification zone overhead is dehydrogenated, the dehydrogenation product is recycled, mixed with said resultant composition, and is fed therewith to said first rectification zone.

5. A process as claimed in claim 1, dehydrogenating the cyclohexanol of said fourth rectification zone overhead to form a resultant dehydrogenation product comprising cyclohexanone and impurities more volatile than cyclohexanone, subjecting the resultant dehydrogenation product to a rectification in a fifth rectification zone to separate the cyclohexanone as fifth rectification zone bottoms from said last-mentioned impurities as fifth rectification zone overhead, and feeding said fifth rectification zone bottoms into said third rectification zone.

References Cited by the Examiner

UNITED STATES PATENTS

| 2,381,032 | 8/1945 | Bludworth | 203—35 |
| 2,410,642 | 11/1946 | Farkas et al. | 260—586 X |
| 2,552,670 | 5/1951 | Fleming | 260—586 X |
| 2,564,200 | 8/1951 | Grekel | 203—69 |
| 2,623,072 | 12/1952 | Ray | 203—81 X |
| 2,931,834 | 4/1960 | Crouch et al. | 260—586 X |
| 2,938,924 | 5/1960 | Simon et al. | 260—586 X |

NORMAN YUDKOFF, *Primary Examiner.*

W. L. BASCOMB, J. GAZEWOOD, M. H. SILVERSTEIN, *Assistant Examiners.*